United States Patent [19]

Pitt et al.

[11] 3,709,826
[45] Jan. 9, 1973

[54] HALOAPATITE PHOSPHORS IN THE FORM OF SPHERICAL PARTICLES AND METHOD OF MAKING SAME

[75] Inventors: Larry L. Pitt, Florissant; James W. Starbuck, Grantwood Village, Mo.

[73] Assignee: Mallinckrodt Chemical Works, St. Louis, Mo.

[22] Filed: June 1, 1970

[21] Appl. No.: 41,818

[52] U.S. Cl. ..........................................252/301.4 P
[51] Int. Cl. ................................................C09k 1/36
[58] Field of Search....252/301.4 P, 301.4 R, 301.6 P

[56] References Cited

UNITED STATES PATENTS

| | | | |
|---|---|---|---|
| 2,962,616 | 11/1960 | Homer et al. | 252/301.4 P |
| 3,586,635 | 6/1971 | Vanik et al. | 252/301.4 F |
| 3,378,335 | 4/1968 | Ellis et al. | 252/62.56 |
| 3,412,034 | 11/1968 | McIntosh | 252/301.2 R |
| 3,457,184 | 7/1969 | Kobayashi et al. | 252/301.4 R |
| 3,538,014 | 11/1970 | Wachtel | 252/301.4 P |
| 3,598,751 | 8/1971 | Frese et al. | 252/301.4 P |
| 3,676,358 | 7/1972 | Dale et al. | 252/301.4 P |

FOREIGN PATENTS OR APPLICATIONS

| | | | |
|---|---|---|---|
| 741,324 | 11/1955 | Great Britain | 252/301.4 P |

*Primary Examiner*—Robert D. Edmonds
*Attorney*—Koenig, Senniger, Powers and Leavitt

[57] ABSTRACT

Alkaline earth haloapatite phosphors are provided in the novel form of substantially spherical particles, having diameters between about 1 and 20 microns. Haloapatite phosphor particles having this configuration are prepared by spray drying a semicolloidal suspension of precipitated haloapatite crystallites. Such a suspension is prepared by reacting aqueous solutions containing the constituent ions of an alkaline earth halophosphate. Desirably, the reaction solution is digested at about 60° C. and filtered to remove the precipitate which is then washed and reslurried to provide the suspension which is fed to the spray dryer. Activators such as antimony and manganese are normally incorporated in the phosphor by including ions of such activators in the reactant solutions. Fluorescent properties of the dried spherical phosphor are fully developed by brief thermal refining at about 1,050° to 1,200° C. Spherical phosphor particles are more readily dispersible in the usual coating media than are the irregular phosphor particles known heretofore. Because of their ability to pack together more closely and have a lesser void fraction, spherical phosphors provide fluorescent lamp coating of improved uniformity and greater optical density.

4 Claims, 3 Drawing Figures

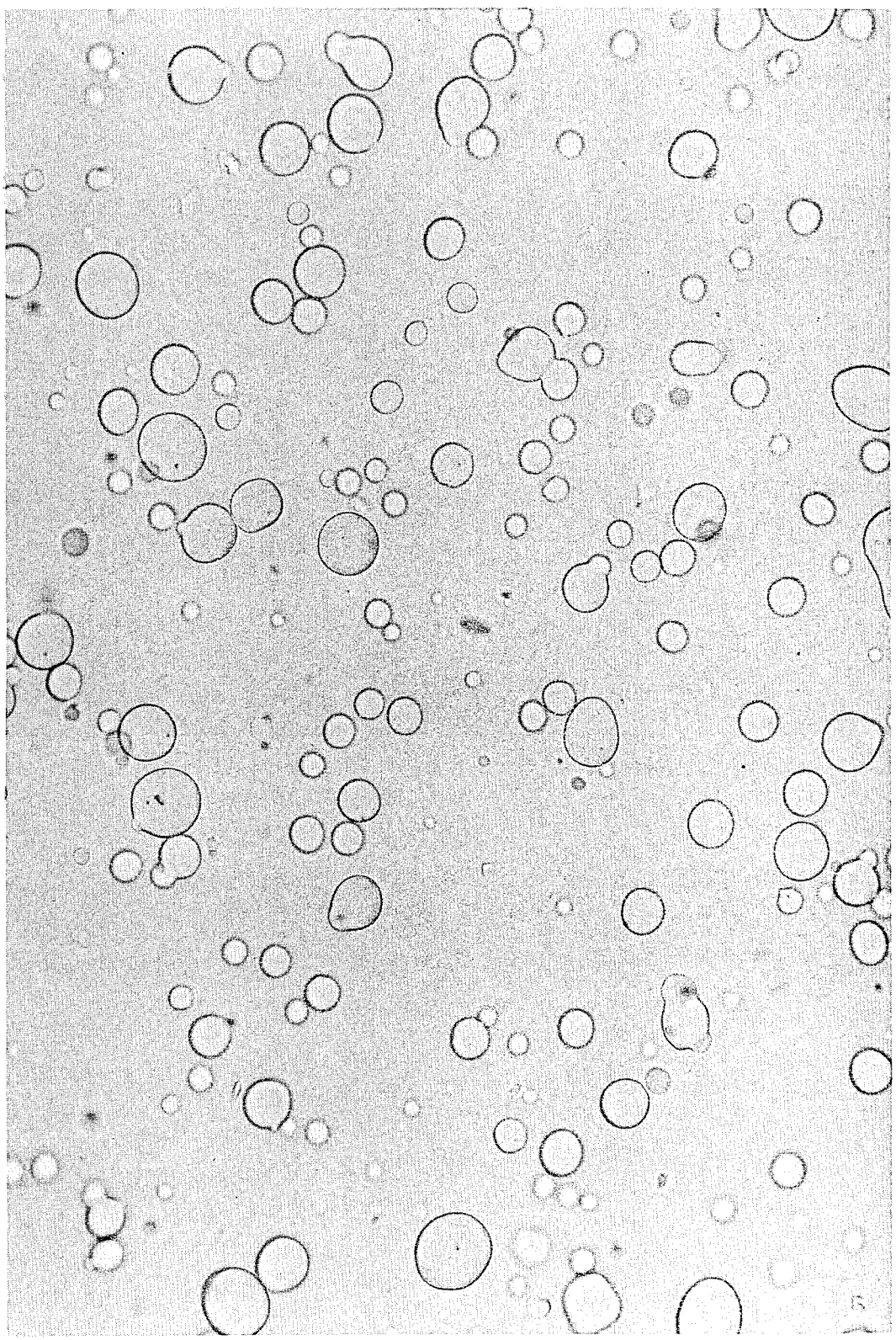

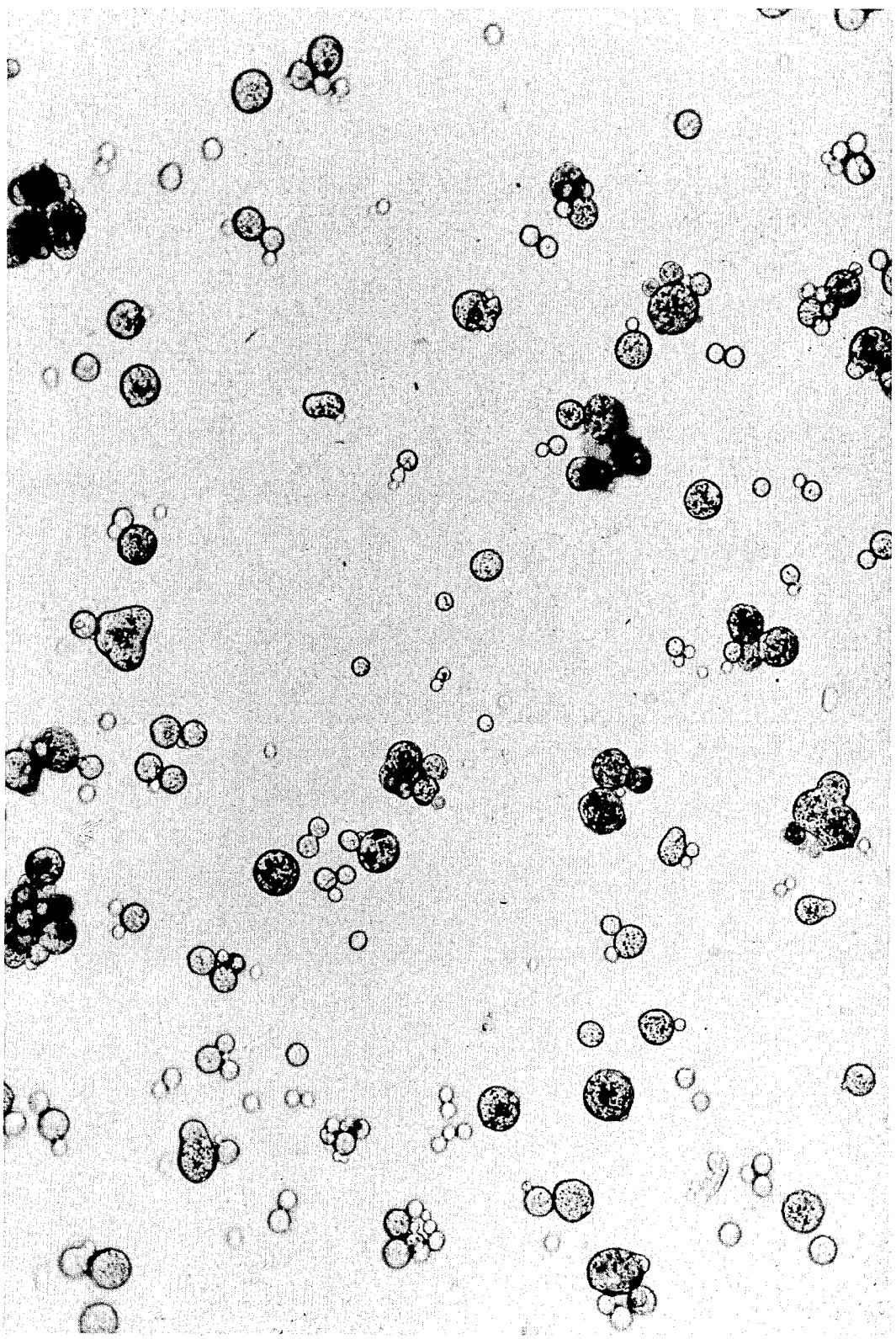

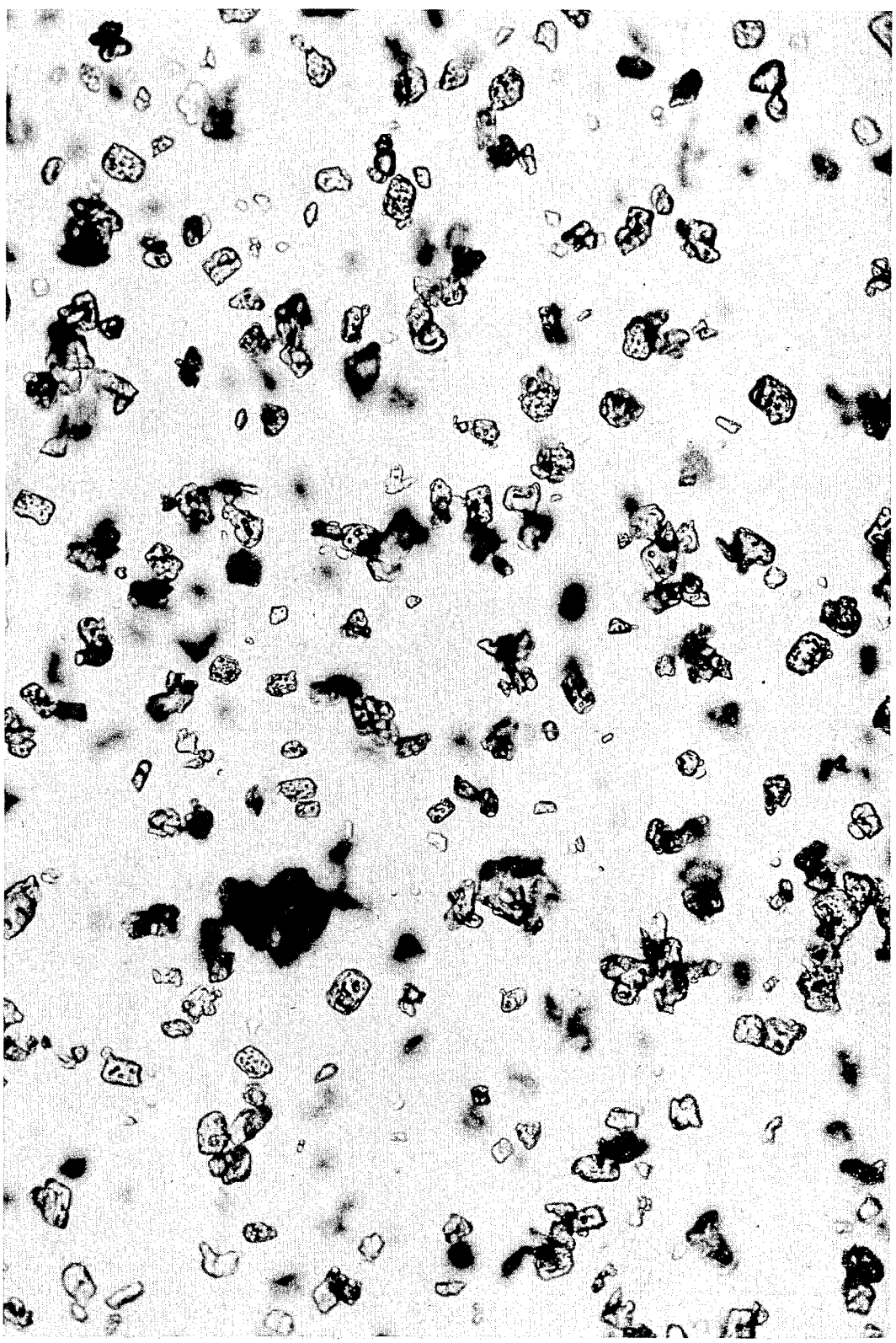

HALOAPATITE PHOSPHORS IN THE FORM OF SPHERICAL PARTICLES AND METHOD OF MAKING SAME

BACKGROUND OF THE INVENTION

The present invention relates to fluorescent substances suitable for coating fluorescent lamps and to methods for preparing them, and more particularly to such substances prepared in a novel and improved form.

Activated alkaline earth haloapatites have long been used as luminescent phosphors for coating fluorescent lamps. Applied to the inside surface of the glass envelope of such a lamp, they emit a diffuse visible light when excited by ultraviolet waves emanating from electrically stimulated vapor inside the lamp. Energy conversion of electricity to light is substantially higher in such lamps than in incandescent lamps.

Such haloapatite phosphors normally consist of a calcium fluophosphate matrix. Some of the calcium is usually replaced by strontium and/or another bivalent metal atom such as cadmium, and some of the fluoride is replaced by chloride. In addition, various activator elements, usually antimony and manganese, are uniformly incorporated in the haloapatite matrix. By varying the proportions of these elements, many useful phosphors, differing in their emission characteristics (e.g., color and brightness) and response to incident radiation may be obtained.

Conventionally, alkaline earth haloapatites are produced by solid state reaction and diffusion processes. Essentially all commercial production of haloapatites has heretofore been carried out by such processes. While solid state processes produce phosphors which exhibit the desired 1 to 20 micron particle size, and are thus reasonably satisfactory, the particles of haloapatite produced by such processes are generally of a highly irregular configuration, with a high surface to volume ratio.

Particles having an irregular configuration suffer from certain recognized disadvantages. For example, a fluorescent lamp coating constituted by such particles tends to have a high fraction of voids and thus a relatively low optical density for a given thickness of coating. Also, such a coating may not be as uniform as desired because of the difficulty of uniformly dispersing irregular haloapatite particles in the coating medium. Irregular particles, moreover, have less than optimum resistance to ultraviolet degradation. It is known that ultraviolet degradation, which gradually lessens the luminescent efficiency of a phosphor, occurs primarily on the surface. Because of the high surface to volume ratio of irregular haloapatite particles, such particles are more exposed to ultraviolet radiation damage than particles of a lower surface to volume ratio would be.

It has been proposed to improve the properties of haloapatite phosphors by preparing them in the form of flat platelets and a method for preparing such platelets has been proposed which consists essentially of precipitating calcium phosphate in the form of the desired platelets and then firing the platelet in the presence of activating and color-modifying elements required to form the desired phosphor. Such platelets, if laid down properly, will pack somewhat like bricks to produce a dense coating of low void fraction and high optical density or opacity. To achieve this effect, however, platelets must be laid down in a carefully controlled manner. If platelets are applied in random fashion, they are not inclined to be properly oriented toward one another and thus the advantage of low void fraction and high optical density is unlikely to be achieved. By the processes of preparation now known to the art, it is also difficult to control the chemical composition and fluorescent properties of platelets.

From the various standpoints of dispersability in a coating medium, uniformity and density of lamp coating, and minimum surface to volume ratio, the optimum configuration for haloapatite phosphors is spherical. It is doubtful, however, whether haloapatite granules of such shape could be produced by prior art processes. There has thus been an unfulfilled need in the art for haloapatite phosphor particles of substantially spherical shape and for processes for preparing such particles.

SUMMARY OF THE INVENTION

Among the several objects of the present invention, therefore, may be noted the provision of a granular haloapatite phosphor material whose particles are of substantially spherical configuration; the provision of such a material consisting predominantly of particles having a diameter between about 1 and about 20 microns; the provision of a granular haloapatite phosphor material which produces a uniform, optically dense coating on the surface of a fluorescent lamp; the provision of a granular haloapatite readily and uniformly dispersible in a coating vehicle; the provision of processes for preparing granular haloapatite phosphor materials having the aforesaid characteristics; the provision of a coating composition which incorporates granular haloapatite phosphor materials of such improved character; and the provision of a luminescent phosphor coating, having improved uniformity and optical density, which is comprised of granular haloapatites of such character. Other objects and features will be in part apparent and in part pointed out hereinafter.

The present invention is thus directed to a granular luminescent phosphor material comprising substantially spherical particles of a polycrystalline alkaline earth haloapatite having a diameter of between about 1 and about 20 microns. The invention is also directed to a fluorescent lamp coating composition comprising a solvent, a binder and a granular luminescent phosphor material suspended in the solvent, the phosphor material comprising substantially spherical particles of a polycrystalline alkaline earth haloapatite having a diameter between about 1 and about 20 microns. The invention is further directed to a luminescent phosphor coating for the surface of a fluorescent lamp tube comprising a relatively thin, tightly packed layer of substantially spherical particles of a polycrystalline alkaline earth haloapatite, the particles having a diameter between about 1 and about 20 microns. Also included in the invention is a method for preparing substantially spherical particles of a granular polycrystalline alkaline earth haloapatite phosphor material, the particles having the above-noted average diameter, which comprises the steps of mixing reactant solutions containing the constituent ions of the haloapatite to form a semicolloidal suspension of haloapatite particles smaller than about 1 micron, spray drying said suspension by contact with a stream of heated gas, and thermally refining the resulting dried substantially spherical haloapatite particles for a brief period at a temperature between about 1,050°C. and 1,200°C. to complete activation of the phosphor material.

BRIEF DESCRIPTION OF THE DRAWINGS

FIG. 1 is a photomicrograph showing a dried spherical phosphor prepared according to the present invention, prior to thermal refining;

FIG. 2 is a photomicrograph of the same phosphor shown in FIG. 1 after thermal refining; and FIG. 3 is a photomicrograph of irregular particles typical of prior phosphors prepared by a conventional firing or ceramic method of the prior art.

Each of these photomicrographs is at 250 $\bar{X}$ magnification.

DESCRIPTION OF PREFERRED EMBODIMENTS

In accordance with the present invention, novel haloapatite phosphors are provided in the form of microspheres of a size suitable for use in coating fluorescent lamps. Under a light microscope, the phosphor particles appear as substantially smooth balls. Replicas of these particles when observed with an electron microscope appear to be composed of randomly oriented, very tiny haloapatite crystallites. These spherical particles can be thermally refined according to the method described in copending, coassigned application of Roger D. Piper, Ser. No. 822,099, filed Apr. 28, 1969, now U.S. Pat. No. 3,668,141, to fully activate and maximize the brightness of the phosphor. When excited by ultraviolet radiation, the spherical particles fluoresce uniformly, giving off a soft diffused light.

Haloapatite phosphors in the form of microspheres possess numerous advantages over the irregular granules and flat platelets known heretofore. Thus, the spherical phosphors of the present invention provide fluorescent lamp coatings of surprising uniformity and density. This is accounted for in part by the ability of smooth spherical particles to pack together more closely with less tendency to have voids, even when applied to a lamp surface in a random fashion. Also, the spherical particles have been found to be more readily dispersible in the usual coating media than the irregular phosphor particles known heretofore. In addition, however, it is believed that the advantages of the spherical particles are in part the result of improved surface characteristics and the minimal surface to volume ratio inherent in the spherical conformation. For example, it is known that ultraviolet degradation, which gradually lessens the luminescent efficiency of the phosphor, occurs primarily on the phosphor surface. Thus, spherical phosphor particles are less subject to that kind of degradation, as well as other types of surface damage, than are irregular particles or platelets in which the surface to volume ratios are substantially greater.

In the practice of the present invention, the feed material for the spray dryer is preferably a semicolloidal suspension of haloapatite crystallites substantially free from granular agglomerates. The suspended crystallites or particles of the semicolloidal suspension should be generally smaller than about 1 micron, typically about 1,000 A.U. in size. If substantially all of the particles are smaller than 1 micron, the spherical product produced is in the form of translucent balls. To the extent that the feed suspension contains an appreciable number of particles whose size is greater than about 1 micron, however, such particles will show up as unwanted inclusions inside the finished spheres. Moreover, if a substantial quantity of larger particles is present in the feed, the spray dried product will consist of irregular particles rather than the desired discrete spheres.

The preferred semicolloidal haloapatite suspension for use as the feed material in the method of the invention can be prepared by precipitation methods. General methods for precipitating alkaline earth haloapatites are disclosed in the coassigned applications of D. J. Frese, R. S. Schreiber and H. C. Bertsch, Ser No. 610,772, filed Jan. 23, 1967 (now abandoned), and Roger D. Piper, Ser. No. 646,493, filed June 16, 1967 (now abandoned), and the copending and coassigned applications of H. C. Bertsch, Ser No. 736,279, filed June 12, 1968, now U.S. Pat. No 3,575,877, and Roger D. Piper, Ser. No. 822,099, filed Apr. 28, 1969.

As disclosed in these applications, a haloapatite is precipitated by mixing at least two reactant solutions, the summation of which contains the constituent ions of the desired phosphor. Typically, one solution contains the cation and activator components of the phosphor while another solution contains the anions. The reactant solutions may be added concurrently or in any order to the precipitation vessel. Concurrent addition is preferred, however, since it permits better control of such factors as pH, concentration of reaction ions and the like.

In order to assure the formation of semicolloidal suspensions, the precipitation is conveniently carried out at or near room temperature, e.g., 20° to 40°C. This temperature is not critical, however, and semicolloidal suspensions can be formed at temperatures below 20°C. and above 40°C. The freshly precipitated haloapatite is desirably filtered from the reactant solution and washed to remove excess anions. The precipitation mixture can also be digested by heating it up to a temperature of about 60°C. for a brief time to improve filterability. Prolonged heating is unnecessary and can be undesirable because of the possibility of agglomerates being formed.

For optimum results, it is desirable that the concentration of the semicolloidal suspension of haloapatite crystallites in the slurry fed to the spray dryer be between about 10 percent and about 20 percent by weight of solids, preferably about 15 percent, since slurries having a solids content within this range are easier to handle. Slurries of the feed material which contain less than 10 percent or more than 20 percent solids can be successfully spray dried by operating rate, particle size control, or operations reliability may be less favorable. If the solids content of the suspension is lower than desired, the suspension may be concentrated, as for example by repeated decantation, after washing and prior to spray drying.

The novel method of this invention is carried out by first preparing a suspension of semicolloidal haloapatite crystallites and then spray drying that suspension. Such a semicolloidal suspension is most expediently prepared through precipitation methods as set forth above. As will be understood by those skilled in the art, however, other methods of producing a semicolloidal suspension of the above-stated type may be used in practicing the present invention.

Spray drying is accomplished by atomizing the semicolloidal suspension to form droplets which are then dried by contact with heated gas in a spray drying chamber. The suspension may be atomized by use of a nozzle, rotating disk or other suitable means. The drying gas is conveniently air, but may be any other gas substantially inert to the feed material, e.g., flue gas. To achieve maximum production rates and energy efficiencies, the drying gas is introduced at a relatively high temperature where possible. Thus, for example, an inlet gas temperature of 300°C. or higher may be used. If the phosphor contains such activators as manganese, of course, the inlet gas temperature should not exceed the temperature at which such activators are oxidized by the gas. The feed suspension is desirably introduced at the maximum rate consistent with the production of dried product. This provides both maximum production and minimum outlet gas temperature and consequently maximum extraction of energy from the gas. Lower feed rates can, of course, be used but provide a less efficient operation.

The particle size of the spherical phosphor product is controlled by adjustment of the solids content of the feed suspension, the size of the particles therein, and the size of the droplets produced by the atomizer. The latter is controlled by the nature and operating parameters of the atomizer. Thus, it will be understood that the size and configuration of a nozzle or the size, configuration and rotating speed of a disk may be adjusted to produce particles of the proper size. The feed rate may also affect the size of the spherical phosphor product and the aforesaid factors may be further adjusted for a change in feed rate. Spherical particles of the desired size may be readily produced by suitable adjustment of these variables within the skill of the art.

Typical spherical granules of haloapatite material recovered from the drying chamber in accordance with the method of the invention are shown in the photomicrograph of FIG. 1. This material can be used as such in the preparation of coatings for the envelopes for fluorescent lamps. The luminescent properties of these granules are enhanced and activation completed, however, if they are subjected to a thermal refining step. In the thermal refining step, the phosphor granules are subjected to a temperature of between about 1,050°C. and 1,200°C. for a brief period of time, i.e., 10 to 20 minutes. Heating is normally conducted with the phosphor material under a nitrogen atmosphere although use of such an atmosphere is not absolutely necessary. The thermal operation can be carried out in any suitable processing equipment, such as a muffle furnace. A photomicrograph of the thermally refined spherical phosphor is shown in FIG. 2.

The spherical phosphors of this invention may be dispersed in a suitable vehicle to provide a novel coating composition for fluorescent lamp tubes. Such a vehicle comprises a solvent and a binder. Either an aqueous or an organic solvent may be used, ethyl cellulose being one illustrative binder which may be used in conjunction with organic solvents, such as xylene and butanol, known to those skilled in the art.

The novel coating compositions of this invention may be used to produce a luminescent phosphor lamp coating which possesses superior properties. In accordance with conventional techniques, the composition of this invention are applied to the interior of the tube or envelope of a fluorescent lamp. The coating so laid down is next heated at low temperatures to remove the solvent. After the solvent has evaporated, the coating is heated at a higher temperature or "lehred" to decompose the binder. On completion of lehring, a uniform layer of spherical phosphors remains on the lamp surface. This layer has a very low fraction of voids and thus, for a given thickness, exhibits a greater optical density or opacity than does a similar layer of previously available haloapatite phosphors.

The following examples illustrate the invention.

EXAMPLE 1

Two reactant solutions were prepared, containing the component elements of an alkaline earth haloapatite.

One solution, Solution A, contained the bivalent alkaline earth ions, ions of an activator element, and chloride ions. Solution A was prepared by mixing:

4166.4 grams of 26.0 percent $CaCl_2$ solution
21.8 grams of $Sb_2O_3$
164 ml. of concentrated hydrochloric acid
17.2 grams of $CdCO_3$
54.4 grams of 39.3 percent $MnCl_2$
Sufficient additional water to bring the solution volume up to 4.0 liters The other solution, Solution B, contained fluoride ions and phosphate ions. Solution B was prepared by mixing:

792.4 grams of $(NH_4)_2HPO_4$
156.4 grams of 40% $NH_4F$ solution
248 ml. of approximately 15 N $NH_4OH$
Sufficient additional water to bring the solution volume up to 8.0 liters.

Precipitation was initiated by simultaneously introducing these solutions into a vessel containing 1,000 ml. of $H_2O$. Solution A was fed at a rate of approximately 65 ml./min. and solution B was added concurrently at approximately 130 ml./min. The contents of the precipitation vessel were constantly agitated during the addition of the reactant solutions.

After completion of the precipitation, the resulting semicolloidal suspension was digested by heating with live steam until the temperature of the precipitation slurry reached 60°C. The slurry was then allowed to cool to room temperature. After the slurry had cooled, a 4-liter portion was vacuum filtered and washed with 2 liters of water. The wet filter cake was analyzed for solids content (21.6 percent) and reslurried with sufficient water to give a suspension containing 15 percent by weight solids.

The semicolloidal suspension was then dried in a gas-heated Nichols/Niro portable model spray dryer with a disc atomizer. The suspension was fed to the dryer at a rate of 40 ml./min. The inlet air temperature was maintained at about 340°C. and the outlet air temperature at 120°–130°C. A dried granular haloapatite was collected from the dryer. Microscopic examination showed the particles of this material to be substantially spherical in shape with a diameter between about 1 and about 20 microns.

The haloapatite material recovered from the spray dryer was then thermally refined to bring it to full activation. Thermal refining was carried out in a furnace at 1,100°C. for a period of approximately 15 minutes.

EXAMPLE 2

The haloapatite material prepare in Example 1 was applied as a coating to the inside of a fluorescent lamp tube according to the following procedure:

A coating vehicle was prepared which consisted of 2.5 grams of ethyl cellulose (type T200) dissolved in 150 ml. of a solvent mixture consisting of 95 percent by weight xylene and 5 percent by weight butanol. To this vehicle, 100 grams of phosphor was added slowly with stirring. The resultant slurry was blended for about 2 hours to achieve uniform dispersion of the phosphor particles. A coating composition suitable for coating a lamp surface was thus produced.

The coating composition was then applied to the interior surface of a lamp by pouring it into a lamp blank in sufficient quantity to coat the inner surface. After coating, the tube was allowed to drain and dry in a vertical position in a forced air cabinet. When draining and drying were complete, the tube was heated (lehred), decomposing the binder and leaving an adherent deposit of the phosphor on the inside of the tube.

The resulting coating had an exceptionally smooth, uniform appearance. The opacity of this tube was measured and the amount of phosphor deposited in the tube was determined. The tube was found to have 4.6 grams of phosphor deposited on its surface. The opacity of the tube was equivalent to the opacity of a tube coated with 6.5 grams of a conventional phosphor.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. The method of preparing substantially spherical particles of a granular polycrystalline alkaline earth haloapatite phosphor material, the particles having a diameter between about 1 and about 20 microns, which comprises the steps of mixing reactant solutions containing the constituent ions of the haloapatite to form a semicolloidal suspension of haloapatite particles smaller than about 1 micron, spray drying said suspension by contact with a stream of heated gas, and thermally refining the resulting dried substantially spherical haloapatite particles at a temperature between about 1,050°C. and 1,200°C. to complete activation of the phosphor material.

2. The method as set forth in claim 1, wherein the semicolloidal suspension of haloapatite particles is heated to a temperature of about 60°C. prior to drying in order to digest said precipitate.

3. The method as set forth in claim 1, wherein the semicolloidal suspension of haloapatite particles is recovered from the reaction solution and washed with water prior to spray drying.

4. The method as set forth in claim 1, wherein said semicolloidal suspension of haloapatite particles is formed at a temperature between approximately 20° and 40°C.

* * * * *